(12) United States Patent
Shiraishi

(10) Patent No.: US 11,494,744 B2
(45) Date of Patent: Nov. 8, 2022

(54) INFORMATION PROCESSING APPARATUS, INFORMATION PROCESSING SYSTEM, AND INFORMATION PROCESSING METHOD

(71) Applicant: Nozomi Shiraishi, Kanagawa (JP)

(72) Inventor: Nozomi Shiraishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/081,578

(22) Filed: Oct. 27, 2020

(65) Prior Publication Data
US 2021/0166199 A1 Jun. 3, 2021

(30) Foreign Application Priority Data

Nov. 28, 2019 (JP) .............................. JP2019-215858
Jun. 23, 2020 (JP) .............................. JP2020-108021

(51) Int. Cl.
*G06Q 10/00* (2012.01)
*G06Q 10/06* (2012.01)
(Continued)

(52) U.S. Cl.
CPC ....... *G06Q 10/20* (2013.01); *G05B 19/41865* (2013.01); *G06Q 10/025* (2013.01);
(Continued)

(58) Field of Classification Search
CPC combination set(s) only.
See application file for complete search history.

(56) References Cited

U.S. PATENT DOCUMENTS 10,163,065 B1 * 12/2018 Koski ............. G06Q 10/063112
2003/0187865 A1 * 10/2003 Frisina ................... G06Q 10/06
(Continued)

FOREIGN PATENT DOCUMENTS

CN        109798905 A  *  5/2019  ............. G01C 21/20
DE    112019002030 T5 *  4/2021  ............ G05B 19/042
(Continued)

OTHER PUBLICATIONS

D. C. Mudie and N. H. Chang, "FAULTS: an equipment maintenance and repair system using a relational database," Ninth IEEE/CHMT International Symposium on Electronic Manufacturing Technology,Competitive Manufacturing for the Next Decade, 1990, pp. 41-46, doi: 10.1109/IEMT9.1990.114977. (Year: 1990).*

*Primary Examiner* — Crystol Stewart
(74) *Attorney, Agent, or Firm* — Harness, Dickey & Pierce, P.L.C.

(57) ABSTRACT

An information processing apparatus includes circuitry configured to receive an input to select a scheduled maintenance activity for an image forming apparatus, identify an executable date on which the scheduled maintenance activity is executable based on setting information and information of the scheduled maintenance activity including a maintenance executable period, stored in a memory. The circuitry is configured to search the memory for another scheduled maintenance activity for the image forming apparatus, having an executable date identical to the identified executable date, and reschedule, on the identified executable date, the scheduled maintenance activity and another scheduled maintenance activity.

16 Claims, 8 Drawing Sheets

(51) Int. Cl.
*G06Q 10/10* (2012.01)
*G05B 19/418* (2006.01)
*G06Q 10/02* (2012.01)

(52) U.S. Cl.
CPC ... *G06Q 10/0639* (2013.01); *G06Q 10/06312* (2013.01); *G06Q 10/063118* (2013.01); *G06Q 10/1097* (2013.01); *Y02P 90/80* (2015.11)

(56) References Cited

U.S. PATENT DOCUMENTS

| | | | | |
|---|---|---|---|---|
| 2005/0154625 | A1* | 7/2005 | Chua | G06Q 10/06 700/100 |
| 2006/0195365 | A1* | 8/2006 | Karabetsos | G06Q 10/025 705/7.19 |
| 2008/0114809 | A1* | 5/2008 | MacBeth | G06Q 10/109 |
| 2009/0210278 | A1* | 8/2009 | Kamisuwa | G06Q 10/0631 705/7.13 |
| 2011/0119604 | A1* | 5/2011 | Lo | G06Q 10/1097 715/762 |
| 2012/0323615 | A1* | 12/2012 | Johnson | G06Q 10/06311 705/7.11 |
| 2013/0102292 | A1* | 4/2013 | Kim | G06Q 10/06311 455/414.1 |
| 2015/0095086 | A1* | 4/2015 | Gopinath | G06Q 10/1093 705/7.18 |
| 2016/0140473 | A1* | 5/2016 | Hodes | G06Q 10/06316 705/7.21 |
| 2016/0282231 | A1* | 9/2016 | Keene | G05B 23/0283 |
| 2017/0046374 | A1* | 2/2017 | Fletcher | G06F 3/0482 |
| 2017/0091688 | A1* | 3/2017 | Lopes | G06Q 10/06314 |
| 2017/0220594 | A1* | 8/2017 | Zhou | G06F 16/178 |
| 2019/0095882 | A1* | 3/2019 | Parker | G07F 9/006 |

FOREIGN PATENT DOCUMENTS

| | | | | |
|---|---|---|---|---|
| JP | 2009146124 A | * | 7/2009 | G06Q 10/00 |
| JP | 2011-197171 | | 10/2011 | |
| JP | 2012-226555 | | 11/2012 | |
| WO | WO-2013165099 A1 | * | 11/2013 | G06Q 10/10 |

* cited by examiner

FIG. 4

| | Sunday | Monday | Tuesday | Wednesday | Thursday | Friday | Saturday |
|---|---|---|---|---|---|---|---|
| | 25 | 26 | 27 | 28 | 29 | 30 | 1 |
| | 2 | 3 | 4 | 5 | 6 SCHEDULED MAINTENANCE A | 7 | 8 |
| | 9 | 10 SCHEDULED MAINTENANCE B | 11 | 12 SCHEDULED MAINTENANCE C | 13 SCHEDULED MAINTENANCE D | 14 | 15 |
| | 16 | 17 | 18 | 19 | 20 | 21 | 22 |
| | 23 | 24 | 25 | 26 SCHEDULED MAINTENANCE E | 27 | 28 | 29 |
| | 30 | 31 | | | | | |

FIG. 5

| | Sunday | Monday | Tuesday | Wednesday | Thursday | Friday | Saturday |
|---|---|---|---|---|---|---|---|
| | 25 | 26 | 27 | 28 | 29 | 30 | 1 |
| | 2 | 3 | 4 | 5 | 6 | 7 | 8 |
| | 9 | SCHEDULED MAINTENANCE B ○ | 11 | 12 SCHEDULED MAINTENANCE C ★ | 13 SCHEDULED MAINTENANCE D × | 14 | 15 |
| | 16 | 17 | 18 | 19 | 20 | 21 | 22 |
| | 23 | 24 | 25 | 26 SCHEDULED MAINTENANCE E × | 27 | 28 | 29 |
| | 30 | 31 | | | | | |

| SCHEDULED MAINTENANCE | MAINTENANCE CONTENTS | MAINTENANCE DATE | REQUIRED MAINTENANCE TIME | MAINTENANCE EXECUTABLE PERIOD |
|---|---|---|---|---|
| A | a | 20YY/MM/DD | 90 | ±6 |
| B | b | 20YY/MM/dd | 60 | ±3 |
| C | c | 20YY/MM/Dd | 45 | ±5 |

| MAINTENANCE CONTENTS | REQUIRED MAINTENANCE TIME | MAINTENANCE EXECUTABLE PERIOD |
|---|---|---|
| a | 90 | ±6 |
| b | 60 | ±3 |
| c | 45 | ±5 |

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application Nos. 2019-215858, filed on Nov. 28, 2019, and 2020-108021, filed on Jun. 23, 2020, in the Japan Patent Office, the entire disclosure of each of which is hereby incorporated by reference herein.

BACKGROUND

Technical Field

The present disclosure relates to an information processing apparatus, an information processing system, and an information processing method.

Related Art

A serviceperson goes to a site where an image forming apparatus is installed to perform on-site maintenance of the image forming apparatus according to a maintenance schedule. When a plurality of maintenance works are scheduled on different dates, the serviceperson needs to visit the site of the apparatus on each of the scheduled dates.

SUMMARY

An embodiment of this disclosure provides an information processing apparatus. The information processing apparatus includes circuitry configured to receive an input to select a scheduled maintenance activity for an image forming apparatus, identify an executable date on which the scheduled maintenance activity is executable based on information of the scheduled maintenance activity stored in a memory and setting information. The information of the scheduled maintenance activity includes a maintenance executable period. The circuitry is configured to search the memory for another scheduled maintenance activity for the image forming apparatus, having an executable date identical to the identified executable date, and reschedule, on the identified executable date, the scheduled maintenance activity and another scheduled maintenance activity.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a diagram illustrating an example of a calendar image indicating scheduled maintenance visits, generated by the information processing system illustrated in FIG. 1;

FIG. 5 is a diagram illustrating an example where a scheduled maintenance visit is selected on the calendar image illustrated in FIG. 4;

FIG. 7 illustrates an example of a table stored in a scheduled maintenance storing unit illustrated in FIG. 3;

FIG. 8 illustrates another example of a table stored in the scheduled maintenance storing unit illustrated in FIG. 3.

DETAILED DESCRIPTION

Figure 1:
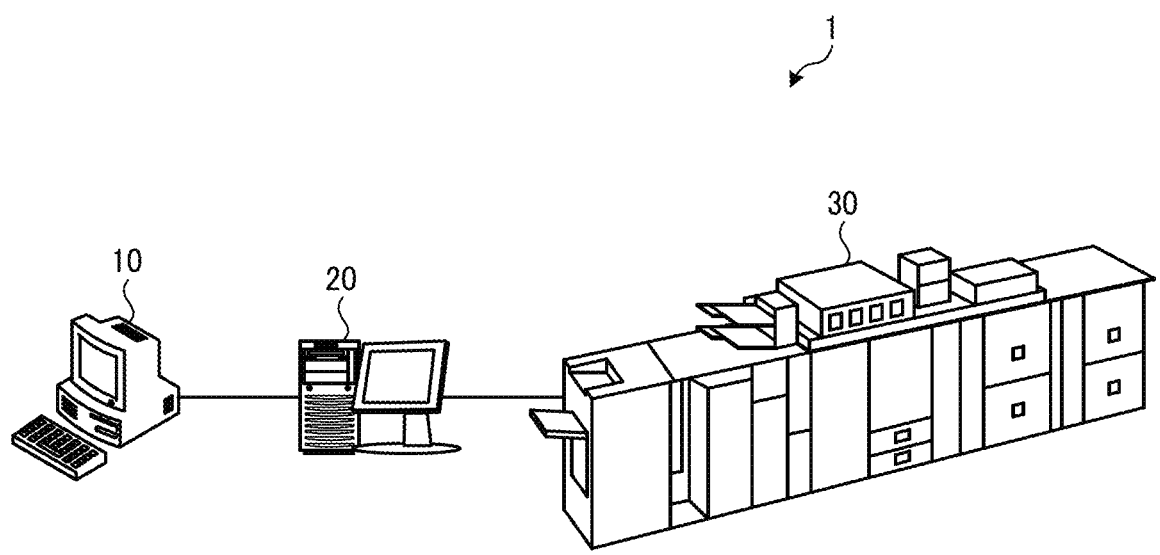
FIG. 1 is a view illustrating an example of a configuration of an information processing system according to an embodiment of the present disclosure.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, an information processing apparatus, an information processing system, and an information processing method according embodiments of to the present disclosure are described. As used herein, the singular forms "a," "an," and "the" are intended to include the plural forms as well, unless the context clearly indicates otherwise.

FIG. 1 is a diagram illustrating an example of a configuration of the information processing system 1 according to the present embodiment. As illustrated in FIG. 1, the information processing system 1 includes a client communication terminal 10, a digital front end (DFE) 20, and an image forming apparatus 30. The information processing system 1 is a system that manages the maintenance of the image forming apparatus 30. The client communication terminal 10, the DFE 20, and the image forming apparatus 30 are connected via a network to communicate with each other. The information processing system 1 illustrated in FIG. 1 includes one client communication terminal 10, one DFE 20, and one image forming apparatus 30, but the number of each apparatus or device may be arbitrarily changed.

The client communication terminal 10 is a terminal such as a personal computer, a tablet terminal, or a smartphone. The client communication terminal 10 displays an image for receiving various operations from a user based on information received from the DFE 20. That is, the client communication terminal 10 accepts various operations relating to maintenance of the image forming apparatus 30.

The DFE 20 is an information processing apparatus that manages maintenance of the image forming apparatus 30 and executes processing relating to the management. The DFE controls a user interface for various operations relating to the maintenance of the image forming apparatus 30. Further, various operations relating to maintenance of the image forming apparatus 30 may be accepted by the DFE 20, instead or in addition to the client communication terminal 10.

The image forming apparatus 30 is a maintenance target apparatus managed by the DFE 20.

Figure 2:
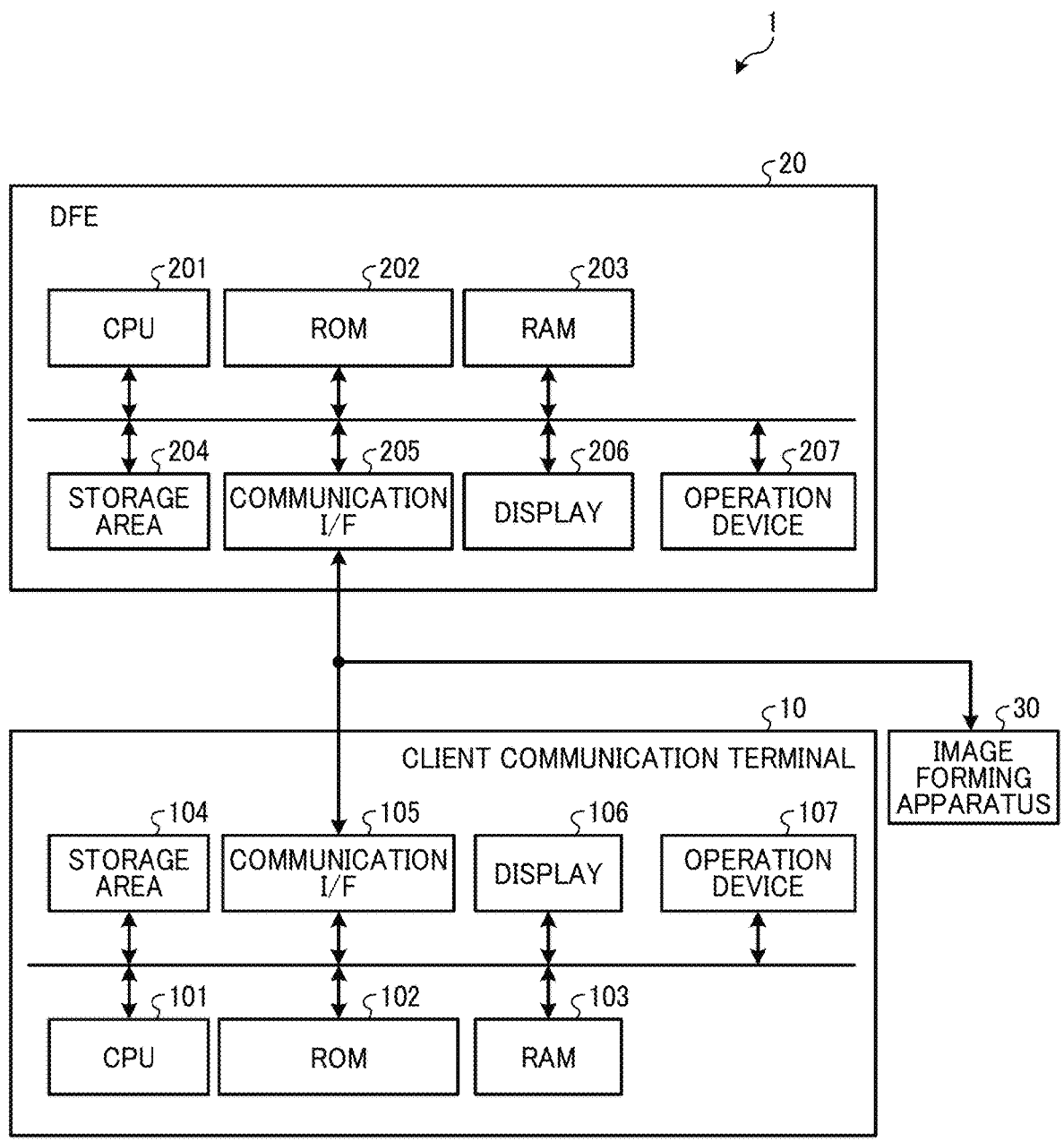
FIG. 2 is a block diagram illustrating an example of a hardware configuration of a client communication terminal and a digital front end (DFE) illustrated in FIG. 1.

A description is given of a hardware configuration of each apparatus or device of the information processing system 1, according to the present embodiment. FIG. 2 is a block diagram illustrating an example of the hardware configurations of the client communication terminal 10 and the DFE 20 according to the present embodiment.

The client communication terminal 10 includes a central processing unit (CPU) 101, a read only memory (ROM) 102, a random access memory (RAM) 103, a storage area 104, a communication interface (I/F) 105, a display 106, and an operation device 107.

The CPU 101 is a processor that comprehensively controls the operation of the client communication terminal 10. The CPU 101 executes a program stored in, for example, the ROM 102 or the storage area 104 using the RAM 103 as a work area, to control the entire operation of the client communication terminal 10.

The ROM 102 is a non-volatile memory that stores a basic input/output system (BIOS) to be executed at start-up of the client communication terminal 10 and various settings. For example, the RAM 103 is a volatile memory that is used as a work area of the CPU 101. Thus, the CPU 101, the ROM 102, and the RAM 103 together construct a computer that controls the overall operation of the client communication terminal 10 and implements various functions of the client communication terminal 10.

The storage area 104 is a non-volatile memory such as a hard disk drive (HDD) or a solid state drive (SSD). The storage area 104 stores an operating system (OS), an application program, and various data.

The communication interface 105 is an interface for communicating with an external device via a network. The communication interface 105 is for communication with the DFE 20 and the image forming apparatus 30.

The display 106 is, for example, a liquid crystal device. The display 106 displays various types of images. The operation device 107 includes, for example, numeric keys and operation keys (buttons), to input various operations from an operator or a user. The client communication terminal 10 can further include a touch panel.

The DFE 20 includes a CPU 201, a ROM 202, a RAM 203, a storage area 204, a communication interface 205, a display 206, and an operation device 207.

The CPU 201 is a processor that comprehensively controls the operation of the DFE 20. The CPU 201 executes a program stored in, for example, the ROM 202 or the storage area 204 using the RAM 203 as a work area, to control the entire operation of the DFE 20.

The ROM 202 is a non-volatile memory that stores a BIOS to be executed at the start-up of the DFE 20, and various settings. The RAM 203 is a volatile memory used as a work area of the CPU 201. Thus, the CPU 201, the ROM 202, and the RAM 203 together construct a computer that controls the overall operation of the DFE 20 and implements various functions of the DFE 20.

The storage area 204 is a non-volatile memory such as an HDD or an SSD. The storage area 204 stores the OS, application programs, and various data.

The communication interface 205 is an interface for communicating with an external device via a network. The communication interface 205 is for communication with the client communication terminal 10 and the image forming apparatus 30.

The display 206 is, for example, a liquid crystal device. The display 206 displays various types of images. The operation device 207 includes, for example, numeric keys and operation keys (buttons), to input various operations from an operator or a user. The DFE 20 can further include a touch panel.

Figure 3:
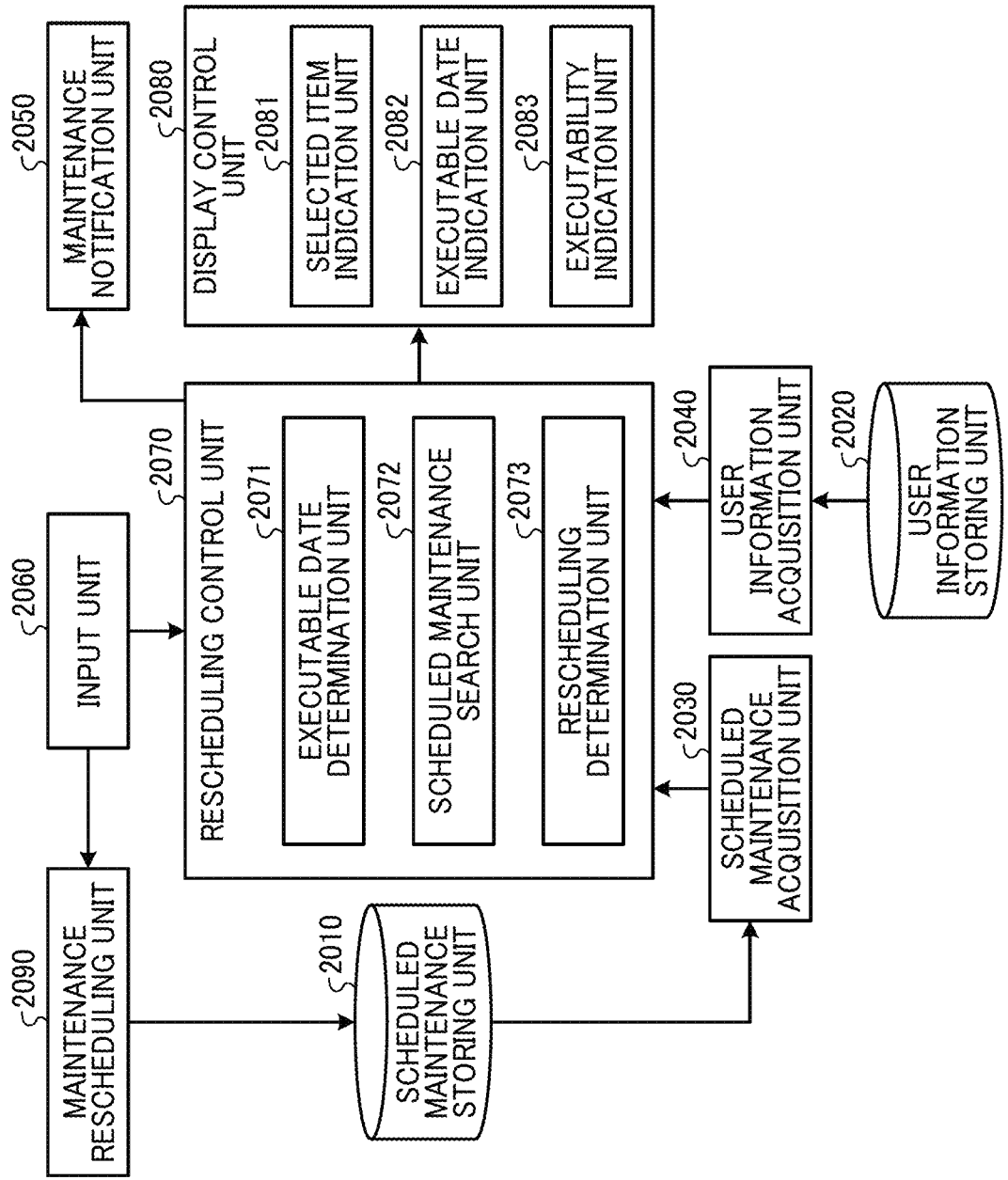
FIG. 3 is a block diagram illustrating an example of a functional configuration of the DFE illustrated in FIG. 2.

Next, a description is given below of characteristic functional blocks of the DFE 20. FIG. 3 is a block diagram illustrating an example of a functional blocks of the DFE 20 according to the present embodiment. For convenience, FIG. 3 mainly illustrates the functions relating to the present embodiment, but the functions of the DFE 20 are not limited thereto.

The CPU 201 of the DFE 20 implements various functions by executing a program stored in, for example, the ROM 202 or the storage area 204. Specifically, the CPU 201 includes a scheduled maintenance storing unit 2010, a user information storing unit 2020, a scheduled maintenance acquisition unit 2030, a user information acquisition unit 2040, a maintenance notification unit 2050, an input unit 2060, a rescheduling control unit 2070, a display control unit 2080, and a maintenance rescheduling unit 2090. The rescheduling control unit 2070 includes an executable date determination unit 2071, a scheduled maintenance search unit 2072, and a rescheduling determination unit 2073. The display control unit 2080 includes a selected item indication unit 2081, an executable date indication unit 2082, and an executability indication unit 2083.

The scheduled maintenance storing unit 2010 stores information of scheduled maintenance activities for the image forming apparatus 30. The information of scheduled maintenance includes information such as maintenance contents, a maintenance timing (e.g., a maintenance executable period), a scheduled maintenance date, and required maintenance time. The maintenance contents represent a maintenance work to be executed for the image forming apparatus 30. The maintenance timing represents the date (or date and time) on which the maintenance is scheduled. The required maintenance time represents the time required for performing the maintenance contents. The scheduled maintenance storing unit 2010 may be provided in another device such as the client communication terminal 10, the image forming apparatus 30, or a server.

The user information storing unit 2020 stores user information. The user information is information including working hours of each user. The user information storing unit 2020 may be provided in another device such as a client communication terminal 10, an image forming apparatus 30, or a server.

The scheduled maintenance acquisition unit 2030 acquires the information of scheduled maintenance stored in the scheduled maintenance storing unit 2010. Further, the scheduled maintenance acquisition unit 2030 outputs the acquired information of scheduled maintenance to the rescheduling control unit 2070. In a configuration where the information of scheduled maintenance is stored in another device such as the client communication terminal 10, the image forming apparatus 30, or the server, the scheduled maintenance acquisition unit 2030 acquires the user information from the device that stores the information of scheduled maintenance.

The user information acquisition unit 2040 acquires the user information stored in the user information storing unit 2020. Then, the user information acquisition unit 2040 outputs the acquired user information to the rescheduling control unit 2070. In a configuration where the user information is stored in another device such as the client communication terminal 10, the image forming apparatus 30, or the server, the user information acquisition unit 2040 acquires the user information from the device that stores the user information.

The maintenance notification unit 2050 notifies the user of generation of a scheduled maintenance activity for the image forming apparatus 30. Further, when a plurality of the maintenance activities is scheduled within a certain period, the maintenance notification unit 2050 prompts the user to put together (reschedule or combine) the scheduled maintenance activities on the same day. For example, the maintenance notification unit 2050 causes the client communication terminal 10 to display a screen prompting to reschedule the scheduled maintenance activities on the same date.

The input unit 2060 receives an input to select at least one scheduled maintenance activity for the image forming apparatus 30. For example, the input unit 2060 receives an input to select the scheduled maintenance activity from the operation device 207 of the DFE 20 or the operation device 107 of the client communication terminal 10. More specifically, the input unit 2060 accepts an input to select scheduled maintenance activity from a calendar image G1 representing a calendar indicating scheduled maintenance activities. Then, the input unit 2060 transmits the input information indicating the scheduled maintenance activity selected by the user to the rescheduling control unit 2070 and the maintenance rescheduling unit 2090. The input unit 2060 may accept inputs for other operations, not limited to the input to select the scheduled maintenance activity.

The rescheduling control unit 2070 controls the extraction of scheduled maintenance activities that can be rescheduled on the same date. The rescheduling control unit 2070 includes the executable date determination unit 2071, the scheduled maintenance search unit 2072, and the rescheduling determination unit 2073.

The executable date determination unit 2071 identifies (determines) at least one executable date, which is the date on which the maintenance contents of the scheduled maintenance activity, selected via the input unit 2060, can be executed. For example, the executable date determination unit 2071 identifies the executable date based on preset setting information and the maintenance executable period stored in the scheduled maintenance storing unit 2010. In the setting information, working days of the user may be set, available dates on which the serviceperson can execute the maintenance work may be set, or both of the working days of the user and the available dates of the serviceperson may be set. Alternatively, other conditions may be set in the setting information.

The scheduled maintenance search unit 2072 searches for the information of scheduled maintenance in which at least one of the executable dates identified by the executable date determination unit 2071 is common. More specifically, the scheduled maintenance search unit 2072 causes the executable date determination unit 2071 to identify the executable dates for each of the scheduled maintenance activities stored in the scheduled maintenance storing unit 2010. Further, the scheduled maintenance search unit 2072 compares the maintenance executable period of each scheduled maintenance activity stored in the scheduled maintenance storing unit 2010 with the maintenance executable period of the scheduled maintenance activity selected by the input unit 2060. In this way, the scheduled maintenance search unit 2072 searches for the information of scheduled maintenance activity assigned with a maintenance executable period including an executable date common to the selected scheduled maintenance activity (identical to the identified executable date of the selected scheduled maintenance activity.

There may be a case where the executable date determination unit 2071 identifies a plurality of executable dates for the scheduled maintenance activity selected by the input unit 2060. In such a case, the scheduled maintenance search unit 2072 may search the scheduled maintenance storing unit 2010 for a scheduled maintenance activity having an executable date common to at least one of the plurality of executable dates identified by the executable date determination unit 2071.

The rescheduling determination unit 2073 can determine whether or not the scheduled maintenance activity searched by the scheduled maintenance search unit 2072 and the scheduled maintenance activity selected by the input unit 2060 can be put together, that is, can be rescheduled, on at least one of the executable dates identified by the executable date determination unit 2071. For example, based on the required time for the scheduled maintenance activity and work hours of the user stored in the user information storing unit 2020, the rescheduling determination unit 2073 determines that the scheduled maintenance activities can be put together on the same date on condition that the total time required for the scheduled maintenance activities is shorter than the work hours of one day of the user.

Note that the input unit 2060 may accept one selection from a plurality of executable dates, and the rescheduling determination unit 2073 may determine whether or not the scheduled maintenance activity searched by the scheduled maintenance search unit 2072 and the scheduled maintenance activity selected via the input unit 2060 can be rescheduled, based on the selected executable date accepted by the input unit 2060.

Further, the rescheduling determination unit 2073 may determine whether or not the scheduled maintenance activities can be rescheduled based on other conditions, not limited to whether or not the required time of maintenance activities rescheduled is shorter than the working hours of the user. Examples depending on which the rescheduling determination unit 2073 determines whether to reschedule the scheduled maintenances are: whether or not a predicted maintenance end time is within the working hours of the user; whether or not the required maintenance time is shorter than the working hours of the serviceperson; and whether or not the predicted maintenance end time is within the regular working hours of the serviceperson.

The display control unit 2080 causes the display 206 to display various images. For example, the display control unit 2080 displays a calendar image G1 representing a calendar indicating scheduled maintenance activities. FIG. 4 is a diagram illustrating an example of the calendar image G1 indicating the scheduled maintenance activities, according to the present embodiment.

As illustrated in FIG. 4, the display control unit 2080 adds an icon G11 to the day on which a maintenance activity is scheduled. In the calendar image G1 illustrated in FIG. 4, "scheduled maintenance A" is scheduled on the 6th, "scheduled maintenance B" is scheduled on the 10th, "scheduled maintenance C" is scheduled on the 12th, "scheduled maintenance D" is scheduled on the 13th, and "scheduled maintenance E" is scheduled on the 26th.

In addition, the icon G11 includes maintenance contents to be performed in the scheduled maintenance activity. For example, the icon G11 includes maintenance contents such as parts replacement and parts cleaning. The icon G11 may include, not limited to maintenance contents, other information such as the scheduled time of the maintenance work and the name of the serviceperson who performs the maintenance work.

The display control unit 2080 includes the selected item indication unit 2081, the executable date indication unit 2082, and the executability indication unit 2083. In response to selecting, by the input unit 2060, of the scheduled maintenance activities to be rescheduled, the display control unit 2080 changes the manner of display (visual representation) of the calendar image G1 with the selected item indication unit 2081, the executable date indication unit 2082, and the executability indication unit 2083.

In this disclosure, FIG. 5 is a diagram illustrating an example where a scheduled maintenance activity is selected on the calendar image G1 according to the present embodiment.

The selected item indication unit 2081 displays the scheduled maintenance activity selected by the input unit 2060 distinguishably from other scheduled maintenance activities. For example, the selected item indication unit 2081 adds a selection mark G12 as an indication of the scheduled maintenance activity selected by the input unit 2060, so that the selected scheduled maintenance activity is distinguishable from other scheduled maintenance activities. When a plurality of scheduled maintenance activities are selected by the input unit 2060, the selected item indication unit 2081 adds the selection mark G12 to each of the plurality of selected scheduled maintenance activities. The distinguishable display is not limited to the addition of the selection mark G12. Alternatively, the selected item indication unit 2081 can change the color of the segment of the corresponding day, add a letter or a numeral as an indication of the scheduled maintenance activity selected by the input unit 2060, or add another mark or a symbol as an indication of the selected scheduled maintenance activity.

The executable date indication unit 2082 displays the executable date identified by the executable date determination unit 2071 in a distinguishable manner. For example, the executable date indication unit 2082 changes the color of the segment of the executable date identified by the executable date determination unit 2071 to be distinguishable from other dates. In the case of the calendar image G1 illustrated in FIG. 5, the days from 6th to 12th are indicated as executable dates. Further, when a plurality of scheduled maintenance activities are selected by the input unit 2060, the executable date indication unit 2082 changes the color of the segment of the executable date common to the selected scheduled maintenance activities. Alternatively, not limited to changing the color of the segment of the executable date, the executable date indication unit 2082 may add a mark, a symbol, a letter, or a numeral as an indication of the executable date, or adopt another display method, for distinguishable display.

The executability indication unit 2083 distinguishably indicates whether or not the scheduled maintenance activities can be rescheduled based on the determination result of the rescheduling determination unit 2073. For example, the executability indication unit 2083 adds a gatherable mark G13 to the scheduled maintenance activities that can be rescheduled, and adds a non-gatherable mark G14 to the maintenance schedule activity that is not gatherable, so that the scheduled maintenance activities can be distinguished. When a plurality of scheduled maintenance activities are selected by the input unit 2060, the executability indication unit 2083 adds the gatherable mark G13 to the scheduled maintenance activities that can be rescheduled commonly to the selected scheduled maintenance activities, and adds the non-gatherable mark G14 to the maintenance schedule activity that is not gatherable. The distinguishable display is not limited to the addition of the gatherable mark G13 and the non-gatherable mark G14. Alternatively, the executability indication unit 2083 may change the color of the segment of the that date, add a mark, a symbol, a letter, or a numeral as an indication of gatherable or not gatherable, or adopt another display method, for distinguishable display.

Further, the display control unit 2080 updates the display of the calendar image G1 representing the calendar in response to the rescheduling of the scheduled maintenance activities or in response to update of information of the maintenance schedule activity.

The maintenance rescheduling unit 2090 reschedules, on the same date, the scheduled maintenance activities accepted by the input unit 2060 and at least one scheduled maintenance activity having a common executable date searched by the scheduled maintenance search unit 2072. More specifically, when there are a plurality of selected scheduled maintenance activities, the maintenance rescheduling unit 2090 changes the date of the plurality of selected scheduled maintenance activities to an execution date accepted by the input unit 2060. In this way, the maintenance rescheduling unit 2090 reschedules the plurality of scheduled maintenance activities by changing the dates of the plurality of scheduled maintenance activities to the same execution date accepted by the input unit 2060. Then, the maintenance rescheduling unit 2090 stores the changed maintenance schedule in the scheduled maintenance storing unit 2010.

Figure 6:
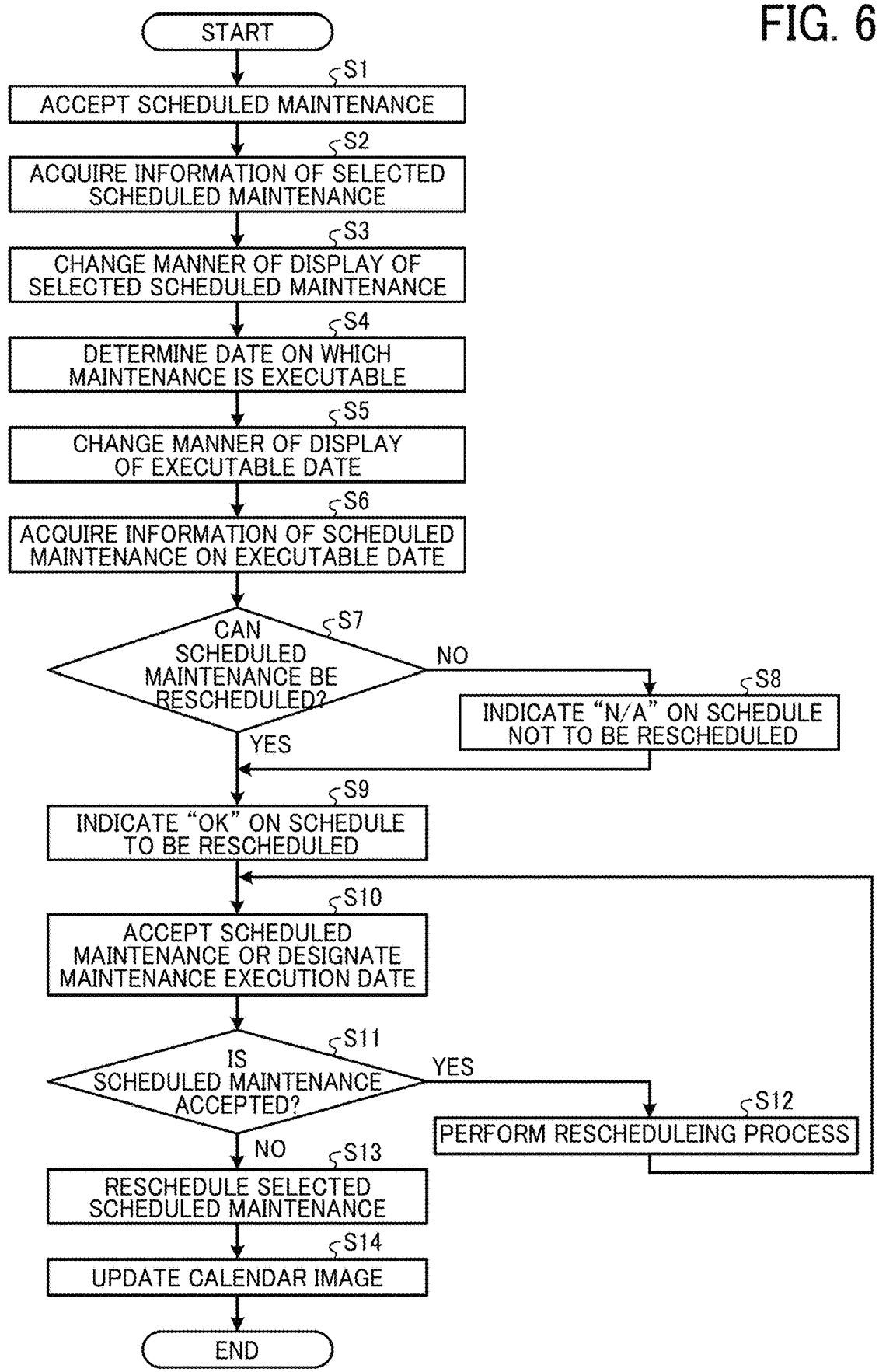
FIG. 6 is a flowchart illustrating a flow of update process executed by the DFE illustrated in FIG. 3.

Next, a description is given of an update process performed by the DFE 20 according to the present embodiment. The update process is a process for updating the maintenance schedule. When a plurality of scheduled maintenance activities are selected, the DFE 20 reschedules the scheduled maintenance activities on the same execution date in the update process. FIG. 6 is a flowchart illustrating a flow of update process executed by the DFE 20 according to the present embodiment.

The input unit 2060 accepts an input to select a scheduled maintenance activity (step S1).

The scheduled maintenance acquisition unit 2030 acquires the information of the selected scheduled maintenance activity from the scheduled maintenance storing unit 2010 (step S2). More specifically, the scheduled maintenance acquisition unit 2030 acquires the maintenance contents, the maintenance date, and required maintenance time of the selected scheduled maintenance activity.

FIG. 7 illustrates a table T1 as an example of the table stored in the scheduled maintenance storing unit 2010. In the example illustrated in FIG. 7, the scheduled maintenance storing unit 2010 stores, in the table T1, the maintenance contents, the maintenance date, the required maintenance time, and the maintenance executable period of the scheduled maintenance activity in association with each other. The maintenance executable period is represented by days before and after the scheduled maintenance date. The contents of the table T1 are not limited thereto, and other information may be further associated and stored.

The maintenance executable period is information that indicates a period in which certain maintenance contents can be executed. That is, the maintenance executable period is a sequence of maintenance executable dates including the scheduled maintenance date and indicates that the maintenance contents in question can be performed, for example, several days before or several days after the scheduled maintenance date.

FIG. 8 illustrates a table T2 as another example of the table stored in the scheduled maintenance storing unit 2010. As illustrated in FIG. 8, the scheduled maintenance storing unit 2010 stores, in the table T2, the maintenance contents, the required maintenance time, and the maintenance executable period in association with each other.

The selected item indication unit 2081 changes the manner of display (visual representation) of the selected scheduled maintenance activity (step S3). That is, the selected item indication unit 2081 adds the selection mark G12 as illustrated in FIG. 5.

The executable date determination unit 2071 determines (identifies) an executable date on which the maintenance contents of the selected scheduled maintenance activity can be executed (step S4).

The executable date indication unit 2082 changes the manner of display of the executable date (step S5). For example, the selected item indication unit 2081 changes the color of the segment of the executable date as illustrated in FIG. 5.

The scheduled maintenance acquisition unit 2030 acquires information of the scheduled maintenance activity on the executable date from the scheduled maintenance storing unit 2010 (step S6).

The rescheduling determination unit 2073 determines whether or not the selected scheduled maintenance and the scheduled maintenance activity on the executable date can be rescheduled on the same date (step S7). For example, the rescheduling determination unit 2073 determines whether or not the total time of the required time of the selected scheduled maintenance activity and the required time of the scheduled maintenance activity on the executable day exceeds the daily working hours of the user.

In response to a determination that there is scheduled maintenance activity that is not gatherable (step S7; No), the executability indication unit 2083 displays an indication that the scheduled maintenance activities are not to be rescheduled (step S8). For example, in response to a determination that there is scheduled maintenance activity that exceeds the working hours of one day, the executability indication unit 2083 adds the non-gatherable mark G14 to the corresponding scheduled maintenance activity as illustrated in FIG. 5.

In response to a determination that the selected scheduled maintenance activity and the scheduled maintenance activity on the executable date can be rescheduled on the same date (step S7; Yes), the executability indication unit 2083 distinguishably indicates that the scheduled maintenance activities can be rescheduled (step S9). For example, the executability indication unit 2083 adds the gatherable mark G13 to the scheduled maintenance activity on the executable date, except the scheduled maintenance activity that is not gatherable. When there is no scheduled maintenance activity gatherable on the executable date, it means that combining of the selected scheduled maintenance activity with another scheduled maintenance activity is not feasible. Accordingly, the DFE 20 (the CPU 201) ends the process.

The input unit 2060 accepts an input to select the scheduled maintenance activity, among the scheduled maintenance activities to which the gatherable mark G13 is added, to be rescheduled in the scheduled maintenance activity selected in step S1, or an input to designate the maintenance execution date (step S10).

The input unit 2060 determines whether or not the input to select the scheduled maintenance activity in step S10 is accepted (step S11).

In response to an acceptance of the input to select the scheduled maintenance activity (step S11; Yes), the DFE 20 executes the rescheduling process illustrated in FIG. 9 (step S12).

In response to an acceptance of the input to designate the execution date of the scheduled maintenance activity (step S11; No), the maintenance rescheduling unit 2090 changes the execution date of the selected scheduled maintenance maintenance (step S13). That is, the maintenance rescheduling unit 2090 changes the date of the selected scheduled maintenance maintenance to the maintenance execution date accepted by the input unit 2060. In a case where not a plurality of scheduled maintenance activities is selected, the maintenance rescheduling unit 2090 updates the execution dates of the scheduled maintenance activities in the update process. That is, when the maintenance rescheduling unit 2090 does not accept the input to select the scheduled maintenance activity, the maintenance rescheduling unit 2090 updates the execution date of the scheduled maintenance activity.

The display control unit 2080 updates the calendar image G1 representing the calendar indicating the scheduled maintenance activities (step S14). That is, the display control unit 2080 updates the display of the calendar image G1 illustrated in FIGS. 4 and 5. Then, the DFE 20 ends the update process.

Figure 9:
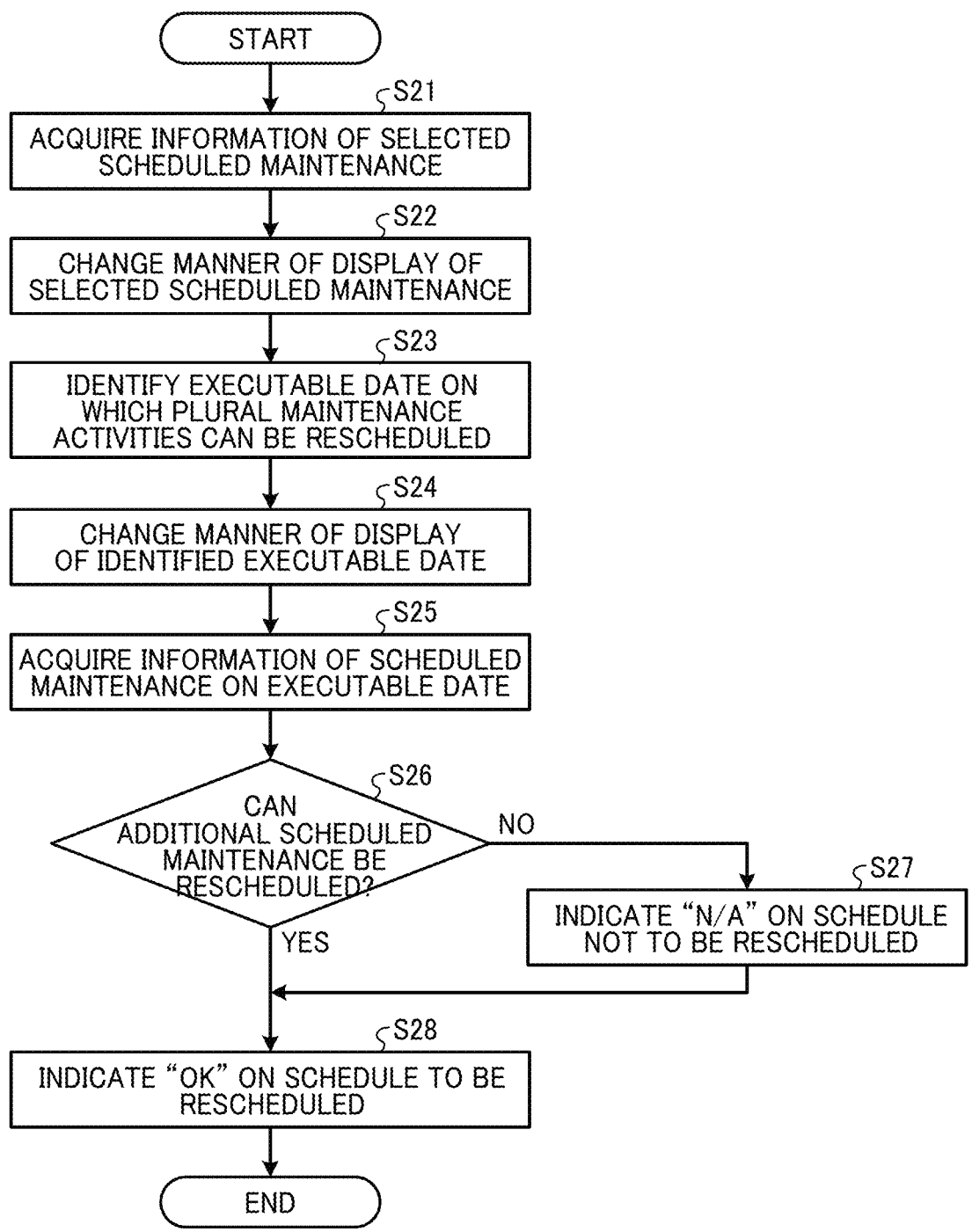
FIG. 9 is a flowchart illustrating a flow of maintenance rescheduling process executed by the DFE illustrated in FIG. 3.

Next, a description is given of the rescheduling process performed by the DFE 20 according to the present embodiment. The rescheduling process is a process for determining whether or not a plurality of scheduled maintenance activities can be rescheduled on the same execution date. FIG. 9 is a flowchart illustrating the flow of the rescheduling process executed by the DFE 20 according to the present embodiment.

The scheduled maintenance acquisition unit 2030 acquires the information of the scheduled maintenance activity newly selected and accepted in step S11 illustrated in FIG. 6 from the scheduled maintenance storing unit 2010 (step S21). More specifically, the scheduled maintenance acquisition unit 2030 acquires the maintenance contents, the maintenance date, and required time of the selected scheduled maintenance activity.

The selected item indication unit 2081 changes the manner of display of the newly selected and accepted scheduled maintenance activity (step S22). That is, the selected item indication unit 2081 adds the selection mark G12 to the newly selected scheduled maintenance activity.

The executable date determination unit 2071 identifies an executable date common to a plurality of selected scheduled maintenance activities (step S23). That is, the executable date determination unit 2071 identifies an executable date common to the scheduled maintenance activity selected and accepted in step S1 and the scheduled maintenance activity selected and accepted in step S11 in FIG. 6.

The executable date indication unit 2082 changes the manner of display of the executable date common to the plurality of scheduled maintenance activities (step S24).

The scheduled maintenance acquisition unit 2030 acquires the scheduled maintenance activity on the executable date from the scheduled maintenance storing unit 2010 (step S25).

The rescheduling determination unit 2073 determines whether or not the scheduled maintenance activity on the executable date can be further rescheduled (step S26). That is, the rescheduling determination unit 2073 determines whether or not the selected plurality of scheduled maintenance activities and the scheduled maintenance activity on the executable date can be rescheduled on the same date. For example, the rescheduling determination unit 2073 determines whether or not the total time of the required time of the selected scheduled maintenance activity and the required time of the scheduled maintenance activity on the executable day exceeds the daily working hours of the user.

In response to a determination that there is a scheduled maintenance activity that is not gatherable (step S26; No), the executability indication unit 2083 displays an indication (e.g., "N/A") that the scheduled maintenance activities are not to be rescheduled (step S27). For example, in response to a determination that there is a scheduled maintenance activity that exceeds the working hours of one day, the executability indication unit 2083 adds the non-gatherable mark G14 to the corresponding scheduled maintenance activity as illustrated in FIG. 5.

In response to a determination that there is a scheduled maintenance activity that can be rescheduled (step S26; Yes), the executability indication unit 2083 displays an indication (e.g., "OK") that the scheduled maintenance activities can be rescheduled (step S28). For example, the executability indication unit 2083 adds the gatherable mark G13 to the scheduled maintenance activity on the executable date, except the scheduled maintenance activity that is not gatherable.

Then, the DFE 20 ends the update process.

As described above, according to the present embodiment, in response to an acceptance, by the input unit 2060, of an input to select at least one scheduled maintenance activity, the DFE 20 searches for a scheduled maintenance activity having at least one executable date common to the executable date of the selected scheduled maintenance activity. Then, the DFE 20 reschedules the scheduled maintenance activities accepted by the input unit 2060 and at least one searched scheduled maintenance activity having the common executable date. Therefore, the DFE 20 according to the present embodiment can support efficient maintenance scheduling.

The present disclosure is not limited to the details of the exemplary embodiments described above, and various variations and improvements are possible. Further, various modifications and variations can be formed by appropriately combining a plurality of constituent elements disclosed in the above-described embodiments. For example, some of the elements described in the above embodiments may be removed.

In the description above, the functions of each part of DFE 20 is implemented by the CPU 201 executing a program or the like stored in a memory, for example, the ROM 202 or the storage area 204. Alternatively, for example, at least a part of the functions of each part of the DFE 20 can be implemented by a dedicated hardware circuit, such as a semiconductor integrated circuit (the functions of the DFE 20 includes the scheduled maintenance storing unit 2010, the user information storing unit 2020, the scheduled maintenance acquisition unit 2030, the user information acquisition unit 2040, the maintenance notification unit 2050, the input unit 2060, the rescheduling control unit 2070, the executable date determination unit 2071, the scheduled maintenance search unit 2072, the rescheduling determination unit 2073, the display control unit 2080, the selected item indication unit 2081, the executable date indication unit 2082, the executability indication unit 2083, and the maintenance rescheduling unit 2090).

Programs to be executed on each apparatus or device of the information processing system 1 according to the above-described embodiment can be recorded, as a file installable or executable by a computer, on a computer-readable recording medium, such as a compact disc-read only memory (CD-ROM), a flexible disk (FD), a compact disc-recordable (CD-R), or a digital versatile disk (DVD) and provided therefrom.

Such a program to be executed on each apparatus or device of the information processing system 1 according to the above-described embodiment can be stored on a computer connected to a network, such as the Internet, to be downloaded from the computer via the network. Alternatively, the computer programs executed in the apparatus or device according to the above-described embodiment can be provided or distributed via a network such as the Internet.

Further, the program executed by each apparatus or device of the information processing system 1 according to the present embodiment may be provided by being incorporated in advance in a ROM or the like.

Note that, in the above-described embodiment, the image forming apparatus 30 is described as a multifunction peripheral (MFP) having at least two of copying, printing, scanning, and facsimile transmission functions. Alternatively, the image forming apparatus 30 may be a copier, a printer, a scanner, or a facsimile machine.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
   circuitry configured to:
   display, on a display, a calendar image representing a calendar;
   receive an input, on the calendar image, to select a scheduled maintenance activity for an image forming apparatus;
   identify an executable date on which the scheduled maintenance activity is executable based on information of the scheduled maintenance activity stored in a memory and setting information, the information of the scheduled maintenance activity including a maintenance executable period;
   search the memory for another scheduled maintenance activity for the image forming apparatus, having an executable date identical to the identified executable date;
   determine whether the scheduled maintenance activity and the another scheduled maintenance activity are reschedulable or not reschedulable based on a condition, the condition including a total time required for the scheduled maintenance activity and the another scheduled maintenance activity being shorter than daily working hours of a user of the image forming apparatus;
   change a manner of display of executable dates, on the calendar image, common to the scheduled maintenance activity and the another scheduled maintenance activity in response to determining that the scheduled maintenance activity and the another scheduled maintenance activity are reschedulable;

display, on the calendar image, a gatherable mark indicating that the scheduled maintenance activity and the another scheduled maintenance activity are reschedulable in response to determining that the scheduled maintenance activity and the another maintenance activity are reschedulable;

display, on the calendar image, a non-gatherable mark indicating that the scheduled maintenance activity and the another scheduled maintenance activity are not reschedulable in response to determining that the scheduled maintenance activity and the another scheduled maintenance activity are not reschedulable;

receive a user's input on the calendar image to reschedule the scheduled maintenance activity and the another scheduled maintenance activity determined to be reschedulable; and reschedule the scheduled maintenance activity and the another scheduled maintenance activity on the identified executable date in response to receiving the input to reschedule the scheduled maintenance activity and the another scheduled maintenance activity.

2. The information processing apparatus according to claim 1,
wherein the information of the scheduled maintenance activity includes a required time of the scheduled maintenance activity.

3. The information processing apparatus according to claim 1,
wherein the circuitry is configured to indicate, on the calendar image, the scheduled maintenance activity distinguishably from the another scheduled maintenance activity.

4. The information processing apparatus according to claim 1, wherein the circuitry is configured to:
determine whether there is a plurality of scheduled maintenance activities within a particular period of time; and
prompt a user of the image forming apparatus to reschedule the plurality of scheduled maintenance activities on a same date.

5. The information processing apparatus according to claim 1, wherein the information of the scheduled maintenance activity includes the maintenance executable period, maintenance contents, a maintenance date, and a maintenance duration.

6. The information processing apparatus according to claim 5, wherein the circuitry is configured to:
store the information of the scheduled maintenance activity in a table.

7. The information processing apparatus according to claim 1, wherein the information of the scheduled maintenance activity includes the maintenance executable period, maintenance contents, and a maintenance duration.

8. The information processing apparatus according to claim 1, wherein the circuitry is further configured to reschedule the scheduled maintenance activity and the another scheduled maintenance activity by combining the scheduled maintenance activity and the another scheduled maintenance activity.

9. An information processing system configured to manage maintenance of an image forming apparatus, the information processing system comprising:
circuitry configured to:
display, on a display, a calendar image representing a calendar;
receive an input, on the calendar image, to select a scheduled maintenance activity for the image forming apparatus;
identify an executable date on which the scheduled maintenance activity is executable based on information of the scheduled maintenance activity stored in a memory and setting information, the information of the scheduled maintenance activity including a maintenance executable period;
search the memory for another scheduled maintenance activity for the image forming apparatus, having an executable date identical to the identified executable date;
determine whether the scheduled maintenance activity and the another scheduled maintenance activity are reschedulable or not reschedulable based on a condition, the condition including a total time required for the scheduled maintenance activity and the another scheduled maintenance activity being shorter than daily working hours of a user of the image forming apparatus;
change a manner of display of executable dates, on the calendar image, common to the scheduled maintenance activity and the another scheduled maintenance activity in response to determining that the scheduled maintenance activity and the another scheduled maintenance activity are reschedulable;
display, on the calendar image, a gatherable mark indicating that the scheduled maintenance activity and the another scheduled maintenance activity are reschedulable in response to determining that the scheduled maintenance activity and the another scheduled maintenance activity are reschedulable;
display, on the calendar image, a non-gatherable mark indicating that the scheduled maintenance activity and the another scheduled maintenance activity are not reschedulable in response to determining that the scheduled maintenance activity and the another scheduled maintenance activity are not reschedulable;
receive a user input on the calendar image to reschedule the scheduled maintenance activity and the another scheduled maintenance activity determined to be reschedulable; and
reschedule the scheduled maintenance activity and the another scheduled maintenance activity on the identified executable date.

10. The information processing system according to claim 9, wherein the information of the scheduled maintenance activity includes the maintenance executable period, maintenance contents, a maintenance date, and a maintenance duration.

11. The information processing system according to claim 10, wherein the circuitry is configured to:
store the information of the scheduled maintenance activity in a table.

12. The information processing system according to claim 9, wherein the information of the scheduled maintenance activity includes the maintenance executable period, maintenance contents, and a maintenance duration.

13. A non-transitory recording medium storing a plurality of program codes which, when executed by one or more processors, causes the processors to perform a method, the method comprising:
displaying, on a display, a calendar image representing a calendar;
receiving an input, on the calendar image, to select a scheduled maintenance activity for an image forming apparatus;

identifying an executable date on which the scheduled maintenance activity is executable based on information of the scheduled maintenance activity stored in a memory and setting information, the information of the scheduled maintenance activity including a maintenance executable period;

searching the memory for another scheduled maintenance activity for the image forming apparatus, having an executable date identical to the identified executable date determining whether the scheduled maintenance activity and the another scheduled maintenance activity are reschedulable or not reschedulable based on a condition, the condition including a total time required for the scheduled maintenance activity and the another scheduled maintenance activity being shorter than daily working hours of a user of the image forming apparatus;

changing a manner of display of executable dates, on the calendar image, common to the scheduled maintenance activity and the another scheduled maintenance activity in response to determining that the scheduled maintenance activity and the another scheduled maintenance activity are reschedulable;

displaying, on the calendar image, a gatherable mark indicating that the scheduled maintenance activity and the another scheduled maintenance activity are reschedulable in response to determining that the scheduled maintenance activity and the another scheduled maintenance activity are reschedulable;

displaying, on the calendar image, a non-gatherable mark indicating that the scheduled maintenance activity and the another scheduled maintenance activity are not reschedulable in response to determining that the scheduled maintenance activity and the another scheduled maintenance activity are not reschedulable;

receiving a user input on the calendar image to reschedule the scheduled maintenance activity and the another scheduled maintenance activity determined to be reschedulable; and rescheduling the scheduled maintenance activity and the another scheduled maintenance activity on the identified executable date.

14. The non-transitory recording medium according to claim 13, wherein the information of the scheduled maintenance activity includes the maintenance executable period, maintenance contents, a maintenance date, and a maintenance duration.

15. The non-transitory recording medium according to claim 14, wherein the method further comprises:

storing the information of the scheduled maintenance activity in a table.

16. The non-transitory recording medium according to claim 13, wherein the information of the scheduled maintenance activity includes the maintenance executable period, maintenance contents, and a maintenance duration.

* * * * *